United States Patent
Sieben

[19]

[11] Patent Number: 5,844,674
[45] Date of Patent: Dec. 1, 1998

[54] VIRTUAL REALITY SYSTEM WITH AN OPTICAL POSITION-SENSING FACILITY

[75] Inventor: Ulrich Sieben, Reute, Germany

[73] Assignee: Deutsche ITT Industries, GmbH, Freiburg, Germany

[21] Appl. No.: 771,132

[22] Filed: Dec. 20, 1996

[30] Foreign Application Priority Data

Dec. 23, 1995 [EP] European Pat. Off. .............. 95120501

[51] Int. Cl.⁶ .................................................. G01B 11/26
[52] U.S. Cl. ................................... 356/139.03; 356/141.3
[58] Field of Search ........................... 359/139.03, 141.3; 348/115

[56] References Cited

U.S. PATENT DOCUMENTS

| | | | |
|---|---|---|---|
| 5,023,943 | 6/1991 | Heberle | 455/603 |
| 5,187,540 | 2/1993 | Morrison | 356/152 |
| 5,577,981 | 11/1996 | Jarvik | 482/4 |

FOREIGN PATENT DOCUMENTS

| | | |
|---|---|---|
| WO 9307602 | 4/1993 | WIPO . |
| WO 9509411 | 4/1995 | WIPO . |

*Primary Examiner*—Mark Hellner
*Attorney, Agent, or Firm*—Plevy & Associates

[57] ABSTRACT

A virtual reality system permanently connected with a device to be worn by a user is disclosed which has an optical position-sensing facility that contains at least one radiation source defining a fixed reference point in space and an optical receiving system permanently connected with the device. The optical receiving system includes three radiation detectors, whose optical axes are parallel to each other. The first radiation detector has a reception pattern which shows a rising/falling sensitivity characteristic in a first angular range. The second radiation detector has a reception pattern which shows a rising/falling sensitivity characteristic in a second angular range. The third radiation detector has a reception pattern which shows a slowly varying sensitivity characteristic within at least the first and second angular ranges.

25 Claims, 4 Drawing Sheets

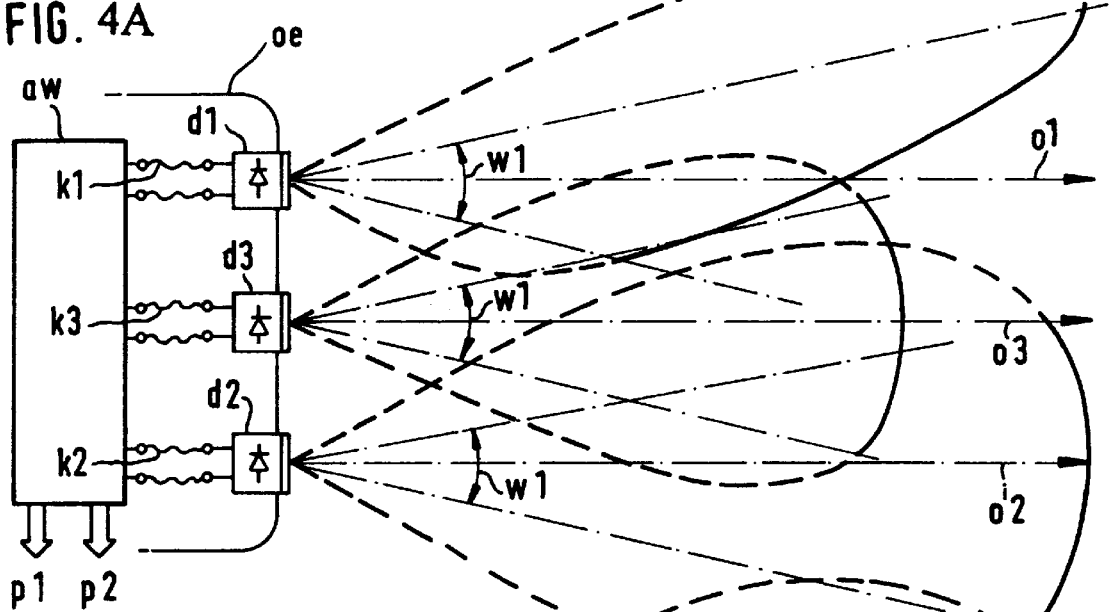
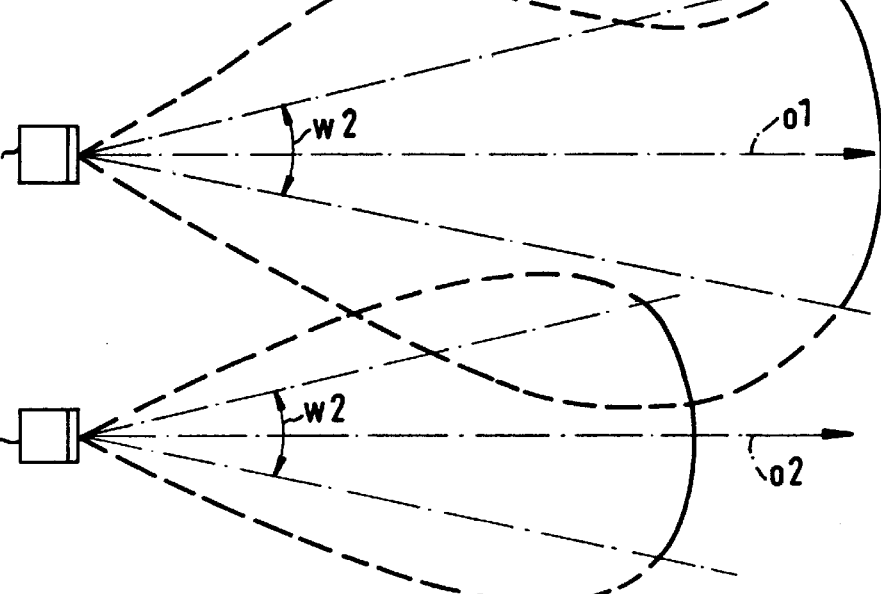
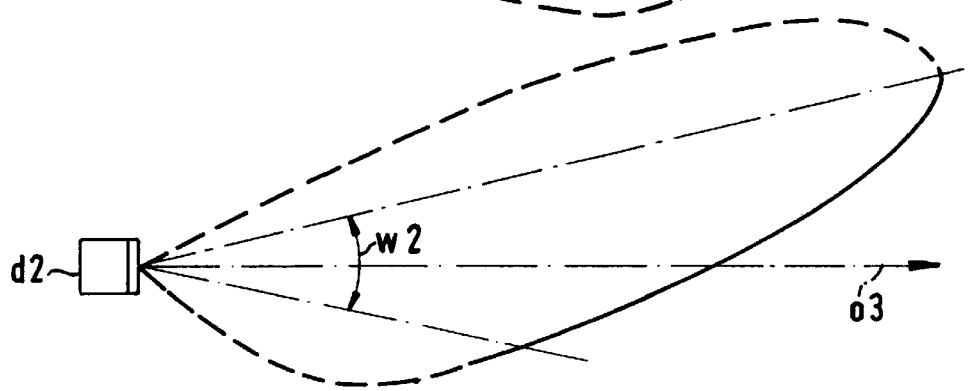

VIRTUAL REALITY SYSTEM WITH AN OPTICAL POSITION-SENSING FACILITY

FIELD OF THE INVENTION

The present invention relates generally to virtual reality and more particularly to a position dependent virtual reality system which gives the user a realistic impression of the virtual reality being viewed.

BACKGROUND OF THE INVENTION

Virtual reality systems use computers and peripheral devices to enable users to perceive and interact with computer generated worlds. In a typical virtual reality system, a user wears garments outfitted with devices which provide information about the position and orientation of the user relative to a fixed reference point. The information is used by the computer system to create a virtual being, wherein the virtual emulates the position, orientation, and movements of the user. The database also includes a virtual environment in which the virtual being exists, and the virtual being may act upon virtual objects in the virtual world in a manner which emulates the actions of the user. For example, the virtual being may pick up a virtual ball and throw it, or the virtual being may drive a virtual car.

To allow the user to perceive the virtual world and the actions his or her virtual being within it, the computer animates the virtual world together with the virtual being and projects the virtual world from the viewpoint of the virtual being on a head mounted display. As the user moves around, his or her actions are sensed by the instrumented garment and used by the computer to alter the position and orientation of the virtual being within the virtual world. The displayed image is also modified to follow the viewpoint of the virtual being so that the user is led to believe he or she actually exists in the virtual world. Thus, a user may lower his or her head and look underneath a virtual object, or the user may walk over to a virtual light switch and, by appropriate movements of the user's hand, turn the switch on and off.

An important feature of a virtual reality system is the ability to animate and display the virtual world in a manner which makes the user believe he or she actually exists within the virtual world. For example, the displayed image must realistically translate and rotate as the user's head translates and rotates. This realistic feature requires that the virtual reality system provide a realistic display wherein the virtual reality image changes as the user moves his or her head.

Accordingly, it is an object of the present invention to provide a virtual reality system with a simple position-sensing facility which senses vertical and/or horizontal movements in at least one predetermined angular range.

SUMMARY OF THE INVENTION

The present invention provides a virtual reality system with a simple position-sensing facility which senses vertical and/or horizontal movements in at least one predetermined angular range. The system is extensible so that movements through 360° can be sensed in a horizontal plane. A further feature is the sensing of an axial rotation about the direction of view.

The present invention includes a virtual reality system permanently connected with a device to be worn by a user, comprising an optical position-sensing facility which includes at least one radiation source defining a fixed reference point in space and an optical receiving system permanently connected with the device. The optical receiving system comprises at least a first radiation detector, a second radiation detector, and a third radiation detector whose optical axes, a first optical axis, a second optical axis, and a third optical axis, respectively, are parallel to each other and, in a basic position, point at the at least one radiation source The first radiation detector has a reception pattern which has, in a first plane defined by the first optical axis and by a first direction determined by the optical receiving system, in a first angular range including the first optical axis, a rising/falling sensitivity characteristic which is essentially monotonic. The second radiation detector has a reception pattern which has, in a second plane defined by the second optical axis and by a second direction determined by the optical receiving system, in a second angular range including the second optical axis, a rising/falling sensitivity characteristic which is essentially monotonic. Lastly, the third radiation detector has a uniform reception pattern which has, within at least the first and second angular ranges, a sensitivity characteristic which varies slowly in comparison with the sensitivity characteristic of the first or second radiation detector.

In an alternative embodiment of the present position sensing facility, the radiation sources become detectors and detectors become radiation sources., whereas, the geometry of the optical system remains unchanged.

BRIEF DESCRIPTION OF THE DRAWINGS

The invention will be better understood with reference to the following illustrative and non-limiting drawings wherein like elements are in which:

FIG. 4 shows the shapes of the three reception patterns in top and side views;

DETAILED DESCRIPTION OF THE INVENTION

The present invention relates to a position-dependent virtual reality system which is permanently connected with a device to be worn by a user and which, by incorporating the relative position in space, gives the user a realistic impression of the virtual reality being viewed. A realistic display requires that the virtual reality image changes as the user moves his head in a lateral or vertical direction.

The advantage of the invention lies essentially in the simplicity of the position sensing system with the associated electronic evaluating facility. The heart is the electrooptical receiving system, comprising three radiation detectors with different reception patterns from which a horizontal position signal and a vertical position signal can be formed by simple means. In the simplest case, different reception patterns can be formed by two masks which are located in front of, and partially cover, the radiation detectors. An angular change results in a change in the respective degree of coverage, so that the received intensity increases or decreases. By comparing the intensity with the intensity received by a radiation detector without a mask, a position signal can be determined which corresponds, to a first approximation, to the respective angular value. A similar electrooptical system is described in European patent, No. EPO 377055, for a position-controlled remote-control transmitter. There, however, it is the transmitter system which has different radiation patterns, not the receiving system. The different reception patterns can be achieved in various ways, e.g., by means of louvers, by a specific design of the radiation detectors, by different refractions of light, by cloudiness, and the like.

Figure 1:
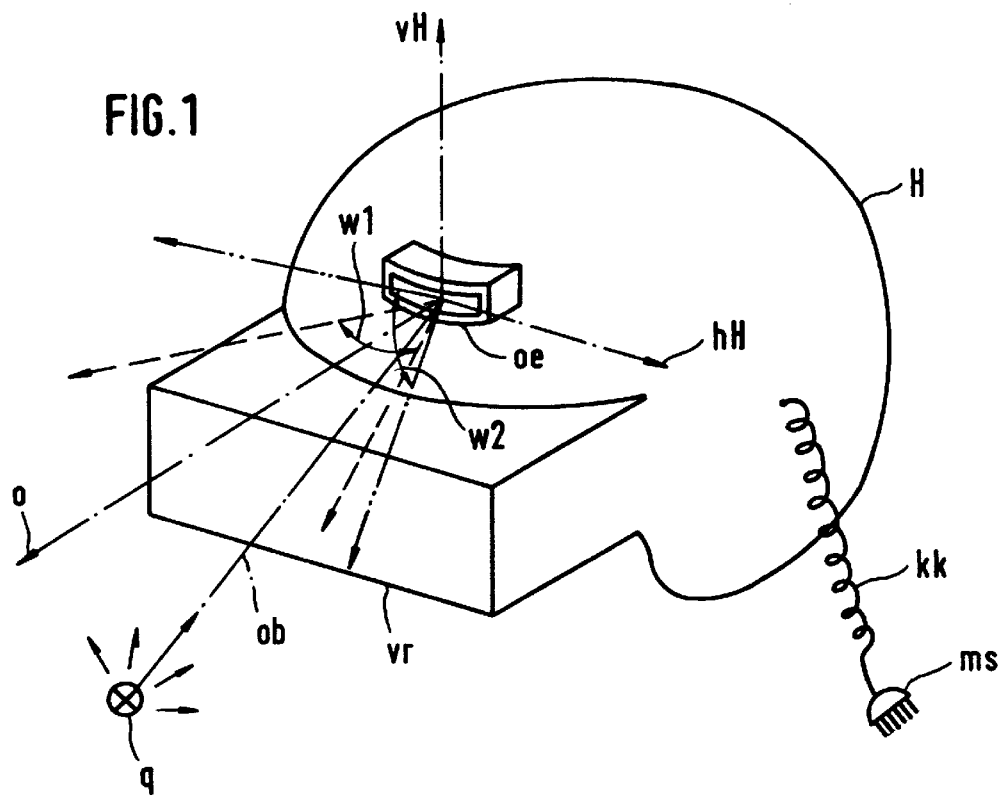
FIG. 1 shows schematically a helmet of a virtual reality system having an optical receiving system permanently connected therewith which permits position sensing in accordance with the invention.

Referring to FIG. 1, there is shown a helmet H which incorporates at its front side the receiving system oe of an electrooptical position-sensing facility for a virtual reality system vr. The receiving system oe is located in the direction of view o of the user, which is determined by the geometry of the helmet. The vertical helmet axis vH is perpendicular to the direction of view o. A horizontal helmet axis hH points in the remaining, third direction in space. The usual rotary movements of the head, and thus of the helmet H, are performed in a vertical plane defined by the direction of view o, and the vertical helmet axis vH; and in a horizontal plane defined by the direction of view o, and the horizontal helmet axis hH Both movements can also be described by polar coordinates in space with corresponding angular information. This only requires a reference point in the horizontal plane, which is defined, for example, by a radiation source q that is fixed in space. The line joining the reference point and the optical receiving system oe defines a space fixed reference direction or reference axis ob. Attached to the side of the helmet is a connecting cable kk with a multi-contact plug ms via which the electronic video signals for the virtual reality system vr, audio signals, and control signals are transmitted. Instead of the helmet, the device to be worn by the user may also be something similar to a pair of glasses if the electronics and the display system can be made small enough.

Figure 2:
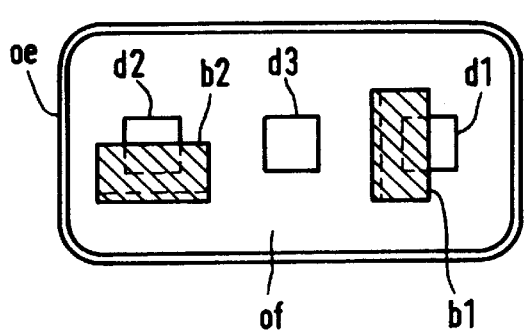
FIG. 2 is a schematic front view of a particularly simple embodiment of the optical receiving system.

Referring now to FIG. 2 there is shown a schematic front view of the optical receiving system oe which has, in the area of the radiation detectors, an optical window for at least the wavelength of the transmitted light. The optical receiving system oe contains three radiation detectors d1, d2 d3. In the embodiment shown, approximately half of the first radiation detector d1 and approximately half of the second radiation detector d2 are covered by first and second masks b1 and b2, respectively. The straight covering edge of the first mask b1 extends in a vertical direction, and the straight covering edge of the second mask b2, extends in a horizontal direction.

Figure 3:
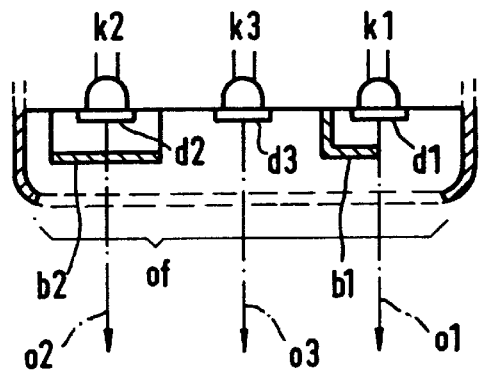
FIG. 3 is a schematic top view of the optical receiving system.

Viewing FIG. 3, which shows the optical receiving system oe in a top view, it is apparent that the effective portions of the masks b1 b2, are located in front of the radiation detectors d1, d2. The positions of the optical axes o1, o2, o3 are determined by the orientations of the three radiation detectors d1, d2 d3, which, without the masks b1 b2, of FIG. 2, should have uniform, rotationally symmetrical reception patterns. The reception patterns are to be modified in a defined manner by the designs of the first and second masks b1 b2. It is also desirable that the three radiation detectors should be planar and form a rectangle which is oriented parallel to the active mask edge. The planar design of the radiation detectors may also be achieved by other means, of course, such as by the use of small ground glass plates.

Referring now to FIG. 4 there are shown four diagrams a) to d). Diagram a) shows the shapes of the reception patterns of the first, second, and third radiation detectors d1, d2 d3, in top views. In a horizontal angular range w1, the first radiation detector d1, shows a rising/falling sensitivity characteristic, depending on the direction in which the angular range w1 is traversed. The second and third radiation detectors d2 d3, have relatively slowly varying characteristics in this angular range w1. The uniform intensity differences are of no significance for the evaluation, because normalization takes place there. Diagrams b) and c) show the relatively slowly varying sensitivity characteristics in a central angular range, the vertical angular range w2, of the first and second radiation detectors d1, d3, in a vertical section along the optical axes o1, o2. In diagram d), however, the vertical angular range w2 of the second radiation detector d2 shows a rising/falling sensitivity characteristic which is essentially monotonic.

Figure 5:
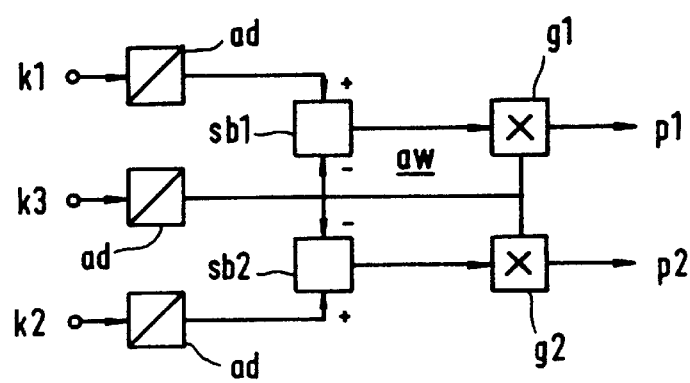
FIG. 5 shows a simple evaluating circuit.

FIG. 5 shows a simple circuit as an example of an evaluating facility aw which derives from the output signals k1, k2, k3 of the three radiation detectors d1, d2 d3, a first position signal p1 and a second position signal p2 which correspond to a horizontal angular deviation and a vertical angular deviation, respectively, from a fixed reference direction ob. The operation of the circuit will be easiest to understand if it is assumed that, if the three optical axes o1, o2, o3 are parallel to the reference direction ob, the respective sensitivities of the three radiation detectors d1, d2 d3, are equal, so that the output signals k1, k2, k3 will also be equal in magnitude. This condition corresponds to the representation of the reception patterns of FIG. 4 if the points of intersection with the horizontal and vertical planes are considered.

To ensure that the sensitivities at the respective points of intersection with the horizontal and vertical planes are equal, the basic sensitivity of each of the first and second radiation detectors d1, d2 must be approximately twice as high as the basic sensitivity of the third radiation detector d3, because the receiving area of the latter (see FIG. 2) is twice as large for the frontal direction of view o. This requirement is easily met by connecting a respective equally large second radiation detector in parallel with each of the first and second radiation detectors d1, d2 and covering these equally large second radiation detectors by masks corresponding to the first and second masks b1 and b2, respectively.

If the reference axis ob and the direction of view o. coincide, the output signals k1, k3 of the first and third radiation detectors d1, d3, will be equal in magnitude, so that the output signal of a first subtractor sb1 will become zero. In the same way, the output signal of a second subtractor sb2, which compares the output signal k2 of the second radiation detector d2 with the output signal k3 of the third radiation detector d3, will become zero. The two position signals p1, p2 thus have the value zero, i.e., there is no angular deviation. If the output signals k1, k2 become greater or smaller, the first and second position signals p1, p2 will change accordingly, thus indicating a corresponding angular deviation. With first and second normalizing circuits g1, g2, the values of the position signals are adapted to the angle-dependent sensitivities of the radiation detectors, which basically correspond to the reception pattern of the third radiation detector d3, so that the usable angular ranges w1, w2 become greater. The normalizing circuits can be implemented with quotient devices, for example.

Figure 6:
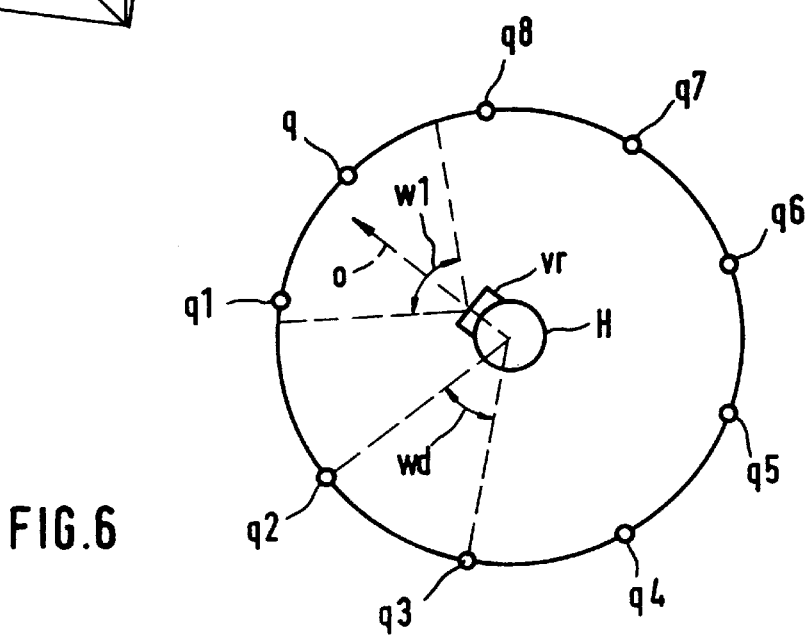
FIG. 6 shows an arrangement of a plurality of radiation sources with which omnidirectional position sensing is possible.

In the arrangement of FIG. 6, besides the radiation source q, which defines a first reference point in space, further radiation sources q1 to q8 are provided which define further fixed reference points and lie in the same horizontal plane as the radiation source q. The radiation sources surround the user, who is represented by the helmet H; approximately in the form of a circle and are spaced approximately equal angular distances wd apart, These angular distances wd are less than or equal to the first angular range w1, which lies in the same plane and is determined by the optical receiving system oe. To be able to distinguish the individual radiation sources from one another, they are activated in a multiplex mode, preferably sequentially. Synchronization with the evaluating circuit aw is accomplished via control signals which are transferred to the helmet H over the corresponding lines kk (see FIG. 1). The evaluating circuit aw must have memory devices and interpolation devices for the respective overlap areas, so that the motion detection remains as uniform as possible over the entire circumference.

Figure 7:
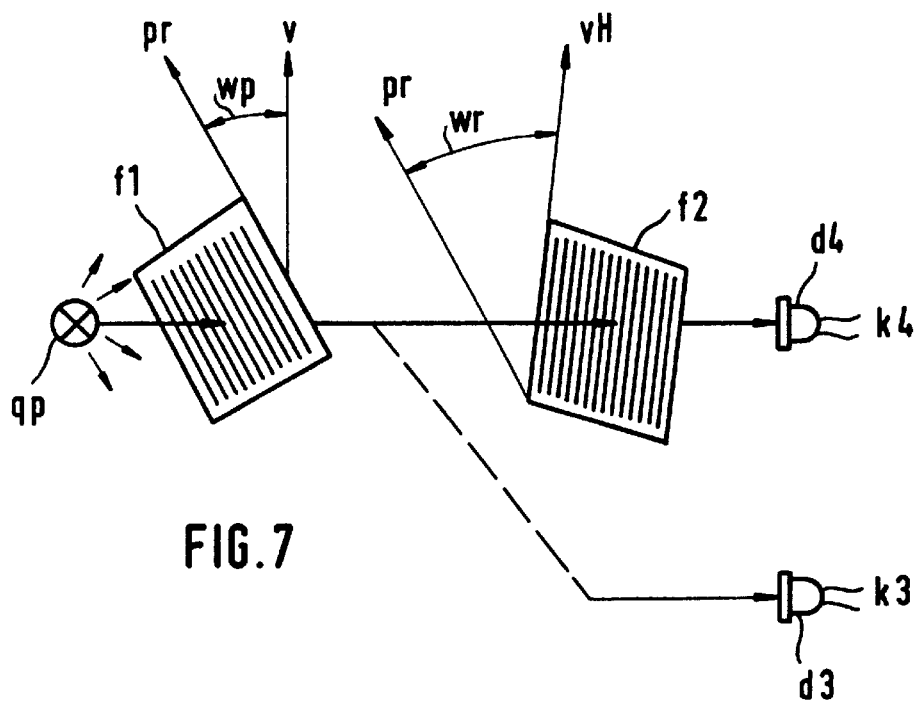
FIG. 7 shows schematically an arrangement with polarizing devices for sensing axial rotation.

FIG. 7 shows schematically a polarization facility with which axial rotations about the direction of view can be sensed. Such an axial rotation is to cause a corresponding rotation in the virtual reality being displayed. As in reality, a 360° rotation is not necessary. This reduces the requirements placed on the optical system. The latter is formed by a respective polarized-radiation source qp which is located next to, or replaces, each of the radiation sources q and q1 to q8. A first polarization filter f1 only passes waves of polarization direction pr. The optical receiving system oe includes a second polarization filter f2 whose polarization direction is, for example, parallel to the vertical helmet axis vH. Finally the radiation is converted into an electric output signal k4 by means of a polarized radiation receiver d4. The reference element required for the comparison may be, for example, the output signal k3 of the third radiation detector d3. More sophisticated detectors based on the polarization-filter principle require a further radiation detector with a further polarization filter whose polarization angle differs from that of the second polarization filter f2. This eliminates ambiguities in the angle information.

The polarization system can be simplified if the polarization direction pr of the polarized-radiation source qp is rotated by about 45° with respect to the vertical direction v, because the evaluation can then be carried out in a similar manner as in the case of the sensitivity patterns of the radiation detectors d1, d2 d3. In a given axial angular range which includes the vertical direction v, the output signal k4 then has a rising/falling characteristic which is essentially monotonic.

Figure 8:
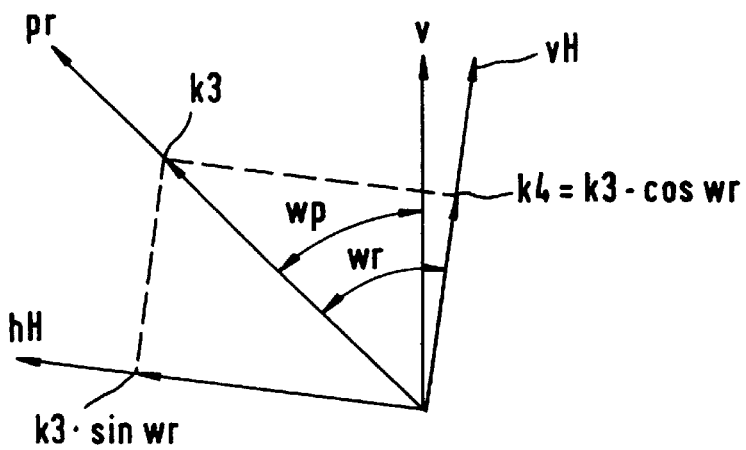
FIG. 8 shows the trigonometric relationships for the arrangement of FIG. 7.

The angular relationships of the polarization facility of FIG. 7 are shown graphically in FIG. 8 by the individual components. The output signal k3 of the third radiation detector d3, corresponds to a first reference value which has the same direction as the polarization direction pr. The output signal k4 corresponds to a second reference value which points in the direction of the vertical helmet axis vH. This reference value is linked with the first reference value k3 via a cosine relation, namely k4=k3·cos(wr), where wr is the axial angle of rotation between the polarization direction pr and the vertical helmet axis vH. If the polarization direction of the second polarization filter f2 coincides with the direction of the horizontal helmet axis hH, the second reference value is a sin relation, namely k3·sin(wr). The required angle of rotation of the vertical helmet axis vH with respect to the vertical direction v is the difference between the angle of rotation wr and the angle of inclination wp of the first polarization filter f1.

Axial rotations about the axis formed by the direction of view o. but also about the horizontal helmet axis hH can also be determined with an electro-mechanically simple system which evaluates the position of the center of gravity of a body. The corresponding position signals can replace or supplement the optically determined position signals.

In most optical systems, beam reversal is possible without the geometry, and thus the basic operation, of the overall system being changed thereby. To illustrate this, reference is made to the radiation system disclosed in the above-mentioned European Patent, No. EPO 377 055, which is inverted with respect to the embodiments described so far. A detailed discussion is therefore not necessary. Still, beam reversal has some consequences, which will now be discussed with the aid of FIGS. 9 and 10.

Figure 9:
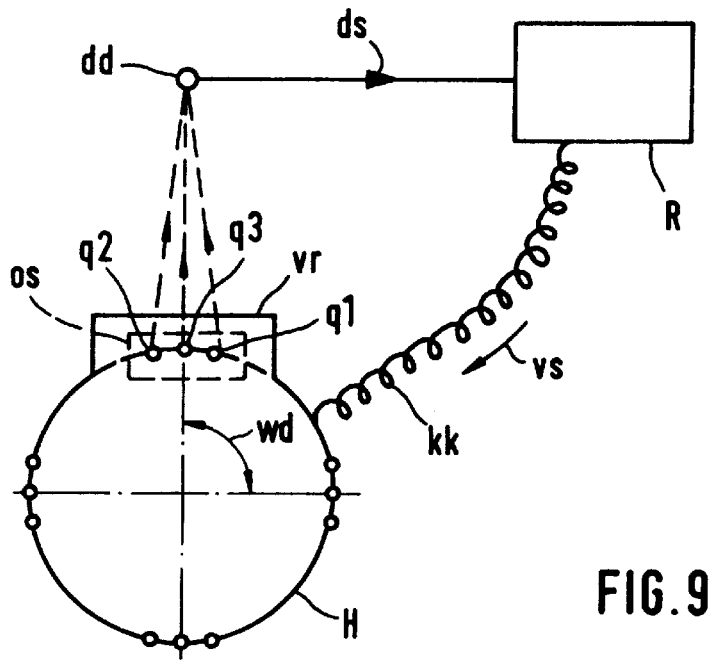
FIG. 9 shows an arrangement with beam reversal.

In FIG. 9, an optical transmitting system os, which is permanently connected with the helmet H. comprises three radiation sources q1, q2, q3. The latter must be activated sequentially so as to be distinguishable one from the other by the single radiation detector dd. The received intensities are fed as electric signals ds to a computer R which computes the associated virtual reality image and feeds the latter as a video signal vs to the virtual reality system vr. In the system illustrated in FIG. 9, no electronic signals relating to the respective position have to be transferred from the helmet H over signal lines kk to the computer R. Therefore, this arrangement is ideally suited for simple systems, such as systems in a rental or virtual reality game center, in which the host computer R is to perform as many functions as possible in order to keep the devices to be worn as simple as possible. In this embodiment, full rotations through 360° are made possible by further optical transmitting systems which are mounted on the helmet H and whose optical axes divide the horizontal plane into equal segments with the angle wd.

Figure 10:
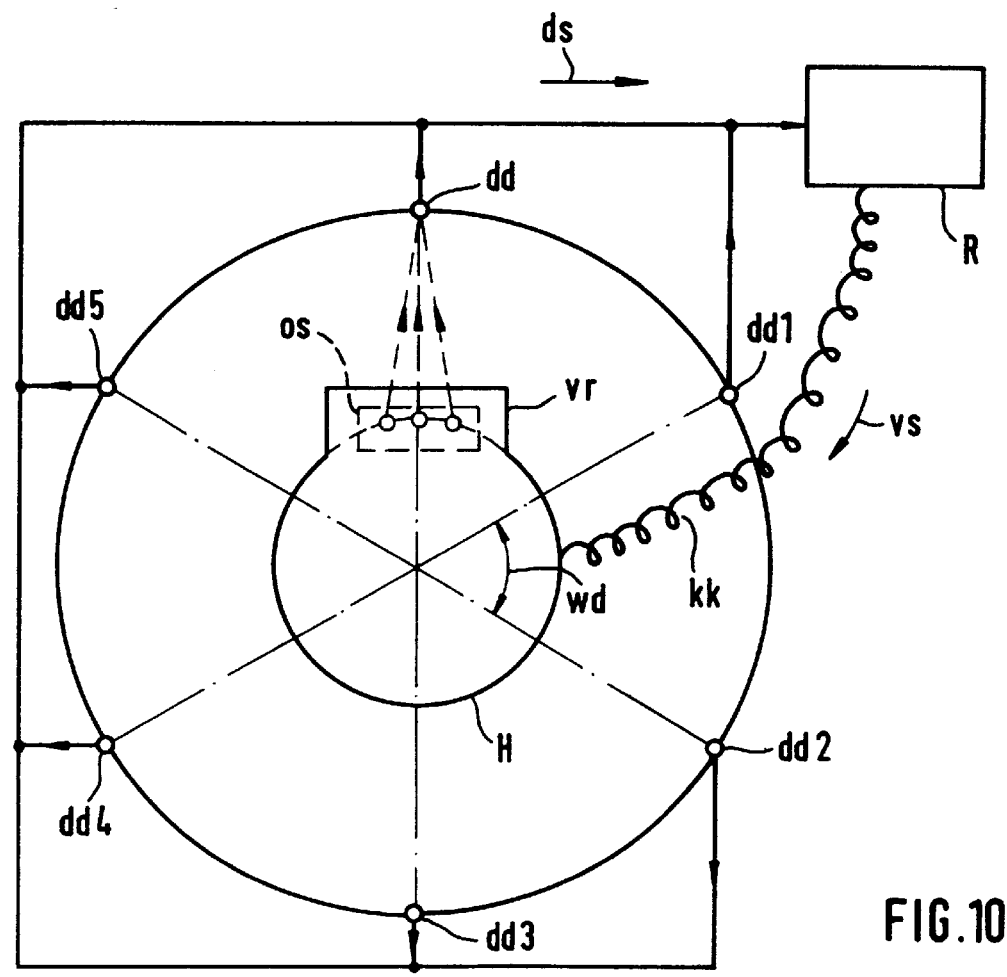
FIG. 10 shows another arrangement with beam reversal.

In FIG. 10, the 360° functionality is achieved by providing not just a single radiation detector dd, but further radiation detectors dd1 to dd5 which also divide the horizontal plane into equal segments with the angle wd with respect to the central position of the helmet H. This arrangement is even more advantageous for the above mentioned game centers, because the helmets H require only a single optical system os. The individual radiation detectors dd, dd1, . . . , dd5 are cyclically interrogated or activated by the computer R.

It should be understood that the embodiment described herein is merely exemplary and that a person skilled in the art may make many variations and modifications to these embodiment utilizing functionally equivalent elements to those described herein. Any and all such variations or modifications as well as others which may become apparent to those skilled in the art, are intended to be included within the scope of the invention as defined by the appended claims.

What is claimed is:

1. A virtual reality system permanently connected with a device to be worn by a user, comprising:

an optical position-sensing facility which comprises at least one radiation source defining a fixed reference point in space;

an optical receiving system permanently connected with said device, said optical receiving system comprising at least a first radiation detector, a second radiation detector and a third radiation detector, whose optical axes, a first optical axis, a second optical axis, and a third optical axis respectively, are parallel to each other and, in a basic position, point at the at least one radiation source;

the first radiation detector, has a reception pattern which has, in a first plane defined by the first optical axis, and by a first direction determined by the optical receiving system in a first angular range including the first optical axis, a rising/falling sensitivity characteristic which is essentially monotonic;

the second radiation detector has a reception pattern which has, in a second plane defined by the second optical axis and by a second direction determined by the optical receiving system, in a second angular range including the second optical axis, a rising/falling sensitivity characteristic which is essentially monotonic; and the third radiation detector has a uniform reception pattern which has, within at least the first and second angular ranges, a sensitivity characteristic which varies slowly in comparison with the sensitivity characteristic of the first or second radiation detector.

2. The virtual reality system in accordance with claim 1, further comprising, in addition to said one radiation source, further radiation sources of a predetermined number which define further fixed reference points, said further radiation sources lying in the same horizontal plane as said one radiation source and essentially forming a circle around the device to be worn by the user and being separated by equal angular distances less than or equal to the first angular range lying in the same plane.

3. The virtual reality system in accordance with claim 1, wherein to sense axial rotations, particularly about the axis formed by the direction of view, the optical position-sensing facility comprises polarization filters, at least one polarized-radiation source, and at least one polarized-radiation detector.

4. The virtual reality system in accordance with claim 2, wherein to sense axial rotations, particularly about the axis formed by the direction of view, the optical position-sensing facility comprises polarization filters, at least one polarized-radiation source, and at least one polarized-radiation detector.

5. The virtual reality system in accordance with claim 3, wherein the output signal of the third radiation detector is a first reference value for the calculation of the axial angle of rotation, and the output signal of the at least one polarized radiation detector is a second reference value for said calculation.

6. The virtual reality system in accordance with claim 4, wherein the output signal of the third radiation detector is a first reference value for the calculation of the axial angle of rotation, and the output signal of the at least one polarized radiation detector is a second reference value for said calculation.

7. The virtual reality system in accordance with claim 5, wherein for the calculation of the axial rotation, the first and second reference values correspond to cosine and sine based trigonometric reference values, respectively, which relate to the polarization directions of a first polarization filter and a second polarization filter.

8. The virtual reality system in accordance with claim 6, wherein for the calculation of the axial rotation, the first and second reference values correspond to cosine and sine based trigonometric reference values, respectively, which relate to the polarization directions of a first polarization filter and a second polarization filter.

9. The virtual reality system in accordance with claim 2, wherein the radiation source and the further radiation sources are activated in a multiplex mode.

10. A virtual reality system permanently connected with a device to be worn by a user, comprising:

an optical position-sensing facility which comprises at least one radiation detector defining a fixed reference point in space;

at least one optical transmitting system permanently connected with said device, said optical transmitting system comprising at least a first radiation source, a second radiation source, and a third radiation source whose optical axes, a first optical axis, a second optical axis, and a third optical axis respectively, are parallel to each other and, in a basic position, point at the at least one radiation detector;

the first radiation source has an intensity pattern which has, in a first plane defined by the first optical axis, and by a first direction determined by the optical transmitting system, in a first angular range including the first optical axis, a rising/falling sensitivity characteristic which is essentially monotonic;

the second radiation source has an intensity pattern which has, in a second plane defined by the second optical axis and by a second direction determined by the optical transmitting system, in a second angular range including the second optical axis, a rising/falling intensity characteristic which is essentially monotonic; and the third radiation source has a uniform intensity pattern which has, at least within the first and second angular ranges, an intensity characteristic which varies slowly in comparison with the intensity characteristic of the first or second radiation source.

11. The virtual reality system in accordance with claim 10, further comprising, in addition to said one radiation detector, further radiation detectors of a predetermined quantity are provided which define further fixed reference points, said further radiation detectors lying in the same horizontal plane as said one radiation detector and essentially forming a circle around the device to be worn by the user and being separated by equal angular distances less than or equal to the first angular range lying in the same plane.

12. The virtual reality system in accordance with claim 10, wherein to sense axial rotations, particularly about the axis formed by the direction of view the optical position-sensing facility comprises first and second polarization filters, at least one polarized-radiation source, and at least one polarized radiation detector.

13. The virtual reality system in accordance with claim 11, wherein to sense axial rotations, particularly about the axis formed by the direction of view the optical position-sensing facility comprises first and second polarization filters, at least one polarized-radiation source, and at least one polarized radiation detector.

14. The virtual reality system in accordance with claim 12, wherein the output signal of the third radiation source is a first reference value for the calculation of the axial angle of rotation, and the output signal of the at least one polarized radiation detector is a second reference value for said calculation.

15. The virtual reality system in accordance with claim 13, wherein the output signal of the third radiation source is a first reference value for the calculation of the axial angle of rotation, and the output signal of the at least one polarized radiation detector is a second reference value for said calculation.

16. The virtual reality system in accordance with claim 14, wherein for the calculation of the axial rotation, the first and second reference values correspond to cosine and sine dependent trigonometric reference values, respectively, which relate to the polarization directions of a first polarization filter and a second polarization filter.

17. The virtual reality system in accordance with claim 15, wherein for the calculation of the axial rotation, the first and second reference values correspond to cosine and sine dependent trigonometric reference values, respectively, which relate to the polarization directions of a first polarization filter and a second polarization filter.

18. In a position dependent virtual reality system permanently connected with a device worn by a user, a position sensing system comprising:

at least one radiation source defining a fixed reference point in space; and an optical receiving system coupled with said device, said optical receiving system comprising at least a first radiation detector, a second radiation detector and a third radiation detector, whose optical axes, a first optical axis, a second optical axis, and a third optical axis, respectively, are parallel to each other and, in a basic position, point at the at least one radiation source.

19. The virtual reality system in accordance with claim 18, wherein the first radiation detector, has a reception pattern which has, in a first plane defined by the first optical axis, and by a first direction determined by the optical receiving system in a first angular range including the first optical axis, a rising/falling sensitivity characteristic which is essentially monotonic.

20. The virtual reality system in accordance with claim 19, wherein the second radiation detector has a reception pattern which has, in a second plane defined by the second optical axis and by a second direction determined by the optical receiving system, in a second angular range including the second optical axis, a rising/falling sensitivity characteristic which is essentially monotonic.

21. The virtual reality system in accordance with claim 20, wherein the third radiation detector has a uniform reception pattern which has, within at least the first and second angular ranges, a sensitivity characteristic which varies slowly in comparison with the sensitivity characteristic of the first or second radiation detector.

22. The virtual reality system in accordance with claim 21, further comprising a plurality of further radiation sources defining further fixed reference points, the further radiation sources being disposed in the same horizontal plane as the one radiation source.

23. The virtual reality system in accordance with claim 22, further comprising at least two polarization filters, at least one polarized radiation source, and at least one polarized radiation detector, which enable the position sensing system to sense axial rotations about an axis formed by a predetermined direction of view.

24. The virtual reality system in accordance with claim 23, wherein the output signal from the third radiation detector is a first reference value for calculation of the axial angle of rotation, and the output signal of the at least one polarized radiation detector is a second reference value for the calculation.

25. The virtual reality system in accordance with claim 22, wherein the at least one radiation source and the further radiation sources are activated in a multiplex mode.

* * * * *